(12) United States Patent
Tsang

(10) Patent No.: US 6,236,899 B1
(45) Date of Patent: May 22, 2001

(54) METHOD AND APPARATUS FOR PERFORMING THREE-DIMENSIONAL ALPHA/BETA TRACKING

(75) Inventor: Shiu Ming Tsang, Queens, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/135,743

(22) Filed: Aug. 18, 1998

(51) Int. Cl.$^7$ .................................................. G06F 17/00
(52) U.S. Cl. ........................ 700/90; 701/205; 701/300; 701/301; 700/90; 706/10; 706/47
(58) Field of Search .............................. 700/90, 86, 28, 700/2, 91; 395/200, 250.31; 706/10, 47; 701/205, 300, 301

(56) References Cited

U.S. PATENT DOCUMENTS

| | | | |
|---|---|---|---|
| 3,828,236 | * | 8/1974 | Close .................................... 318/561 |
| 4,494,060 | * | 1/1985 | Chitayat et al. . | |
| 4,775,903 | * | 10/1988 | Knowles ........................... 360/78.07 |
| 5,272,639 | * | 12/1993 | McGuffin ............................ 701/207 |
| 5,285,379 | * | 2/1994 | Gamble ................................ 364/160 |

\* cited by examiner

Primary Examiner—Ayaz Sheikh
Assistant Examiner—Firmin Backer

(57) ABSTRACT

A computer-implemented method and apparatus for performing alpha-beta tracking, which generate an alpha curve, representing position errors between a predicted three-dimensional position and a reported three-dimensional position of the track of interest at a plurality of times; generate a beta curve, representing velocity errors between a predicted velocity and a reported velocity of the track of interest at the plurality of times; plot the alpha curve and the beta curve in a probability versus error plane; determine an acceleration and a change in acceleration for the track of interest at each of the plurality of times; and perform three-dimensional alpha-beta tracking on the track of interest such that as the three-dimensional alpha-beta tracking moves along the alpha curve and the beta curve in the probability versus error plane in a first direction, when a magnitude of the change in acceleration is negative, the three-dimensional alpha-beta tracking continues to move along the alpha curve and the beta curve in the first direction and when the magnitude of the change in acceleration is positive, the three-dimensional alpha-beta tracking moves along the alpha curve and the beta curve in a second direction, opposite to the first direction.

15 Claims, 4 Drawing Sheets

METHOD AND APPARATUS FOR PERFORMING THREE-DIMENSIONAL ALPHA/BETA TRACKING

BACKGROUND OF THE INVENTION

1. Field of the Invention

In general, the present invention relates to the computer-implemented method and apparatus for performing three-dimensional alpha/beta tracking. In particular, the method and apparatus of the present invention utilize a change in acceleration in order to determine a direction of movement along an alpha curve and a beta curve in a probability versus error plane. The change in acceleration of a track is used to introduce or dampen oscillations around the track in order to ensure that a tracking error does not grow exponentially, resulting in unacceptable expansion of its prediction windows, which brings in clutter and undesirable tracks.

2. Description of the Prior Art

In conventional tracking systems, if the probability of detection ($P_D$) per scan is high, if accurate target location measurements are made, if the target density is low, and if there are only a few false alarms, the design of the correlation logic (i.e., associating detections with tracks) and tracking filter (i.e., filter for smoothing and predicting track positions) is straightforward. However, in a realistic radar environment these assumptions are seldom valid, and the design of an automatic tracking system is complicated. In actual situations, one encounters target fades (changes in signal strength due to multipath propagation, blind speeds, and atmospheric conditions), false alarms (due to noise, clutter, interference, and jamming), and poor radar parameter estimates (due to noise, unstabilized antennas, unresolved targets, target splits, multipath propagation, and propagation effects). An accurate tracking system must deal with all these problems.

Conventional tracking systems include contact entry logic, coordinate systems, tracking filter, maneuver-following logic, track initiation, and correlation logic. The simplest tracking filter is the alpha-beta ($\alpha$-$\beta$) filter described by $$x_s(k) = x_p(k) + \alpha[x_m(k) - x_p(k)] \quad (1)$$

$$V_s(k) = V_s(k-1) + \beta[x_m(k) - x_p(k)]/T \quad (2)$$

$$x_p(k+1) = x_s(k) + V_s(k)T \quad (3)$$

where $x(k)$ is the smoothed position, $V_s(k)$ is the smoothed velocity, $x_p(k)$ is the predicted position, $x_m(k)$ is the measured position, T is the scanning period (time between detections), and $\alpha$ and $\beta$ are the system gains.

The minimal mean-square-error (MSE) filter for performing the tracking when the equation of motion is know as the Kalman filter. The Kalman filter is a popular filter for radar and is a recursive filter which minimizes the MSE. The state equation in xy coordinates for a constant-velocity target is $$S(t+1) = \theta(t) + \Gamma(t)A(t) \quad (4)$$

where with X(t) being the state vector at time t, consisting of position and velocity components x(t), x(t), y(t); t $$\Gamma(t) = \begin{vmatrix} T^2/2 & O \\ T & O \\ O & T^2/2 \\ O & T \end{vmatrix} \text{ and } A(t) = \begin{vmatrix} a_x^{(t)} \\ a_y^{(t)} \end{vmatrix}$$

+1 being the next observation time; T being the time between observations; and $a_x(t)$ and $a_y(t)$ being random accelerations with covariance matrix Q(t) The observation equation is $$Y(t) = M(t) + V(t) \quad (5)$$

where $$Y(t) = \begin{vmatrix} x_m(t) \\ y_m(t) \end{vmatrix} \quad M(t) = \begin{vmatrix} 1 & 0 & 0 & 1 \\ 0 & 0 & 0 & 0 \end{vmatrix} \text{ and } V(t) = \begin{vmatrix} v_x(t) \\ v_y(t) \end{vmatrix} \quad (6)$$

with Y(t) being the measurement at time t, consisting of positions $x_m(t)$ and $y_m(t)$, and V(t) being a zero-mean noise whose covariance matrix is R(t).

The problem is solved recursively by first assuming that the problem is solved at time t−1. Specifically, it is assumed that the best estimate $\hat{X}(t-1|t-1)$ at time t-1 and its error covariance matrix $P(t-1|t-1)$ are known, where the caret in the expression of the form $\hat{x}(t|s)$ signifies an estimate and the overall expression signifies that X(t) is being estimated with observations up to Y(s). The six steps involved in the recursive algorithm are:

1. Calculate the one-step prediction $$\hat{X}(t|t-1) = \phi(t-1)\hat{X}(t-1|t-1) \quad (7)$$

2. Calculate the covariance matrix for the one-step prediction $$P(t|t-1) = \phi(t-1)P(t-1|t-1)\phi^T(t-1) + \Gamma(t-1)Q(t-1)\Gamma^T(t-1) \quad (8)$$

3. Calculate the predicted observation $$\hat{Y}(t|t-1) = M(t)\hat{X}(t|t-1) \quad (9)$$

4. Calculate the filter gain matrix $$\Delta(t) = P(t|t-1)M^T(t)[M(t)P(t|t-1)M^T(t) + R(t)]^{-1} \quad (10)$$

5. Calculate the new smoothed estimate $$\hat{X}(t|t) = \hat{X}(t|t-1) + \Delta(t)[Y(t) - \hat{Y}(t|t-1)] \quad (11)$$

6. Calculate the new covariance matrix $$P(t|t) = [I - \Delta(t)M(t)]P(t|t-1) \quad (12)$$

In summary, starting with an estimate $\hat{X}(t|t-1)$ and its covariance matrix $P(t|t-1)$, after a new observation Y(t) has been received and the six quantities in the recursive algorithm have been calculated, a new estimate $\hat{X}(t|t)$ and its covariance matrix $P(t|t)$ are obtained.

It has been shown that, for a zero random acceleration Q(t)=O and a constant measurement covariance matrix R(t)=R, the alpha-beta ($\alpha$-$\beta$) filter can be made equivalent to the Kalman Filter by setting $$\alpha = \frac{2(2k-1)}{k(k+1)} \quad (13)$$

and $$\beta = \frac{6}{k(k+1)} \quad (14)$$

on the kth scan. Thus as time passes, $\alpha$ and $\beta$ approach zero, applying heavy smoothing to the new samples. Usually it is worthwhile to bound $\alpha$ and $\beta$ from zero by assuming a random acceleration $Q(t) \neq 0$ corresponding to approximately a 1-g maneuver.

The predicted position of velocities generated by an alpha/beta tracker can divergently oscillate about a track true position from scan to scan resulting in the loss of a track. These divergent oscillations can be caused by the uncertainties in a track position in velocity, or by linear or angular accelerations in time. Conventional alpha/beta trackers inherently do not fully account for acceleration, if they account for acceleration at all. When these divergent oscillations cyclically deviate from the predictions, the alpha/beta tracker will divergently over- and under-compensate for its errors from scan to scan. In this situation, a small error exponentially grows into a gross error, resulting in an unacceptable expansion of prediction windows, thereby bringing in clutter and undesirable tracks.

SUMMARY OF THE INVENTION

The present invention solves this problem by providing a method and apparatus in which a change in acceleration of a track is used to introduce or dampen oscillations around the track.

In the present invention, the alpha curve, which represents the position of the track, is applied to an error between the predicted and reported predictions to determine a track's current position. The beta curve, which represents the velocity of the track, is applied similarly to the error in velocity. The index into the alpha/beta curve is usually a constant or adjusted proportionally with the error. When the absolute values of the errors in the multiple scans begin to grow, the independent variable of the alpha/beta curves are finely adjusted in the opposite direction in its traversal along the curve. The amount of adjustment is further interpolated to remove any quantization errors. In this way, consistent over- or under-predictions are corrected by the artificial injection of an oscillation. Divergent oscillations are dampened to bring them under control. Perfect predictions, due mainly to chance, will have no movement along the alpha/beta curve, but predictions resulting from the "rails" of the two curves are bounced back into the range of the curve. Time adjustments are made to reflect sensor rotations. These adaptations have demonstrated superior performance for the alpha/beta tracker in many field tests.

It is therefore, an object of the present invention to provide a method and apparatus which ensure that a tracking error does not exponentially grow, resulting unacceptable expansion of a prediction window, thereby bringing in clutter and thereby undesirable tracks, wherein the change in acceleration is inversely used to introduce or dampen oscillations around the track.

It is therefore, another object of the present invention to provide a method and apparatus which performs accurate three-dimensional alpha/beta tracking.

The method and apparatus of the present application achieves this object by utilizing a change in acceleration of a track inversely in order to introduce or dampen oscillations around a track.

The present invention achieves this object by providing an apparatus for performing three-dimensional alpha-beta tracking on a track of interest, comprising: alpha curve generating means for generating an alpha curve, representing position errors between a predicted three-dimensional position and a reported three-dimensional position of the track of interest at a plurality of times; beta curve generating means for generating a beta curve, representing velocity errors between a predicted velocity and a reported velocity of the track of interest at the plurality of times; plotting means for plotting the alpha curve and the beta curve in a probability versus error plane; acceleration determining means for determining an acceleration and a change in acceleration for the track of interest at each of the plurality of times; and three-dimensional alpha-beta tracking means for performing three-dimensional alpha-beta tracking on the track of interest such that as said three-dimensional alpha-beta tracking means moves along the alpha curve and the beta curve in the probability versus error plane in a first direction, when a magnitude of the change in acceleration is negative, said three-dimensional alpha-beta tracking means continues to move along the alpha curve and the beta curve in the first direction and when the magnitude of the change in acceleration is positive, said three-dimensional alpha-beta tracking means moves along the alpha curve and the beta curve in a second direction, opposite to the first direction.

The present invention further achieves this object by providing a computer-implemented method for performing alpha-beta tracking, comprising the steps of: (a) generating an alpha curve, representing position errors between a predicted three-dimensional position and a reported three-dimensional position of the track of interest at a plurality of times; (b) generating a beta curve, representing velocity errors between a predicted velocity and a reported velocity of the track of interest at the plurality of times; (c) plotting the alpha curve and the beta curve in a probability versus error plane; (d) determining an acceleration and a change in acceleration for the track of interest at each of the plurality of times; and (e) performing three-dimensional alpha-beta tracking on the track of interest such that as the three-dimensional alpha-beta tracking moves along the alpha curve and the beta curve in the probability versus error plane in a first direction, when a magnitude of the change in acceleration is negative, the three-dimensional alpha-beta tracking continues to move along the alpha curve and the beta curve in the first direction and when the magnitude of the change in acceleration is positive, the three-dimensional alpha-beta tracking moves alone the alpha curve and the beta curve in a second direction, opposite to the first direction.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
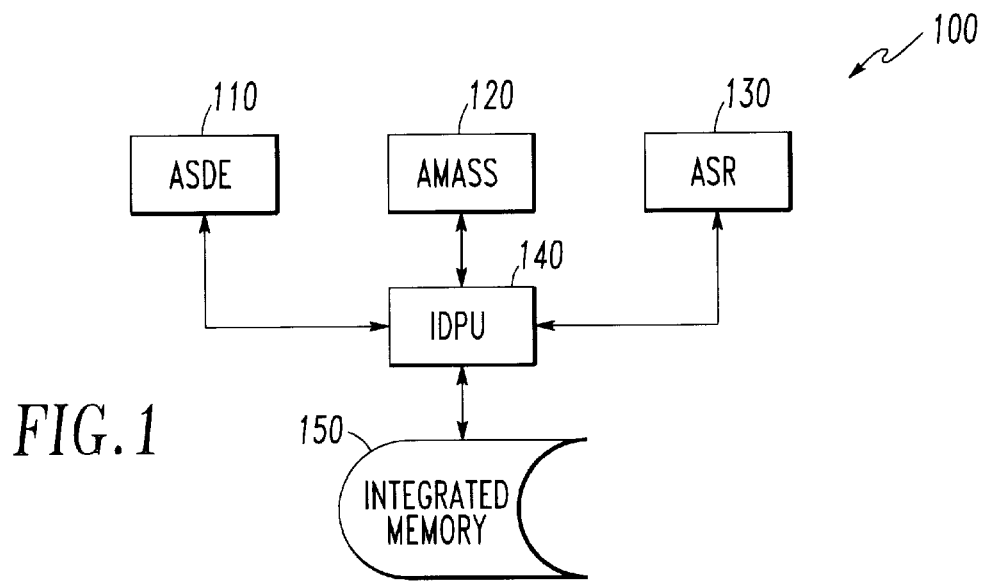
FIG. 1 illustrates an integrated air traffic control suite into which one embodiment of the present invention is implemented.

FIG. 1 illustrates an integrated air traffic control suite 100, into which one embodiment of the present invention is implemented. The air traffic control suite 100 includes an Airport Surface Detection Equipment (ASDE) suite 110, which is a ground surface radar system for detecting airplanes and other airport vehicles on the ground. The integrated air traffic control suite 100 also includes an Airport Movement Area Safety System (AMASS) 120 which receives ASDE 110 radar inputs and identifies targets in order to predict incursions and/or accidents. Finally, the integrated air traffic control suite 100 includes the Airport surveillance radar (ASR) 130 system which is a radar system for approaching aircraft.

The integrated air traffic control suite 100 further includes an Incursion and Display Processing Unit (IDPU) 140 which integrates the ASDE 110, AMASS 120, and ASR 130 data in an integrated memory 150 and produces airport displays, which include airplanes represented as icons, tracks, and lines and tags which include identifying information for each aircraft.

Figure 2:
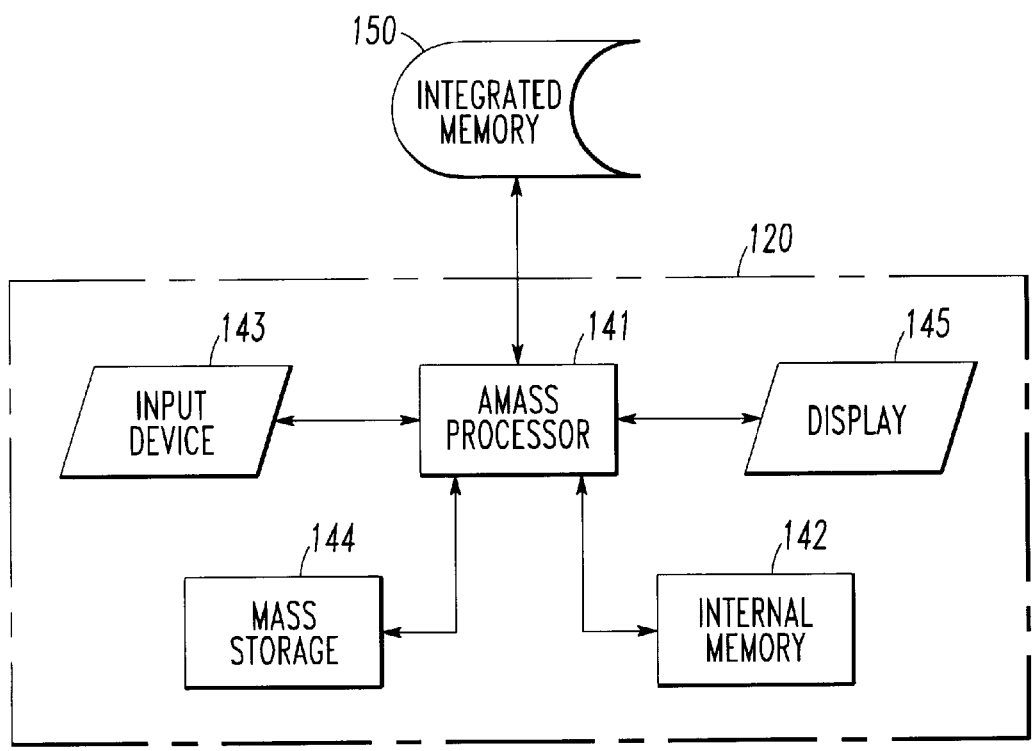
FIG. 2 illustrates a preferred embodiment of the present invention.

The functions of the apparatus and method of the present invention are performed by the AMASS 120, which is illustrated in further detail in FIG. 2. The AMASS 120 includes an AMASS processor 141, internal memory 142, an input device 143, a mass storage 144, and a display 145.

The AMASS processor 141 performs conventional alpha/beta tracking but controls movement on the alpha curve and the beta curve in a probability versus error plane in order to introduce or dampen oscillations around a track to prevent small errors from exponentially growing into gross errors. The operations performed by the AMASS processor 141 will be described below in conjunction with the flowchart illustrated in FIG. 3 and the graphs illustrated in FIGS. 4–7.

Figure 3:
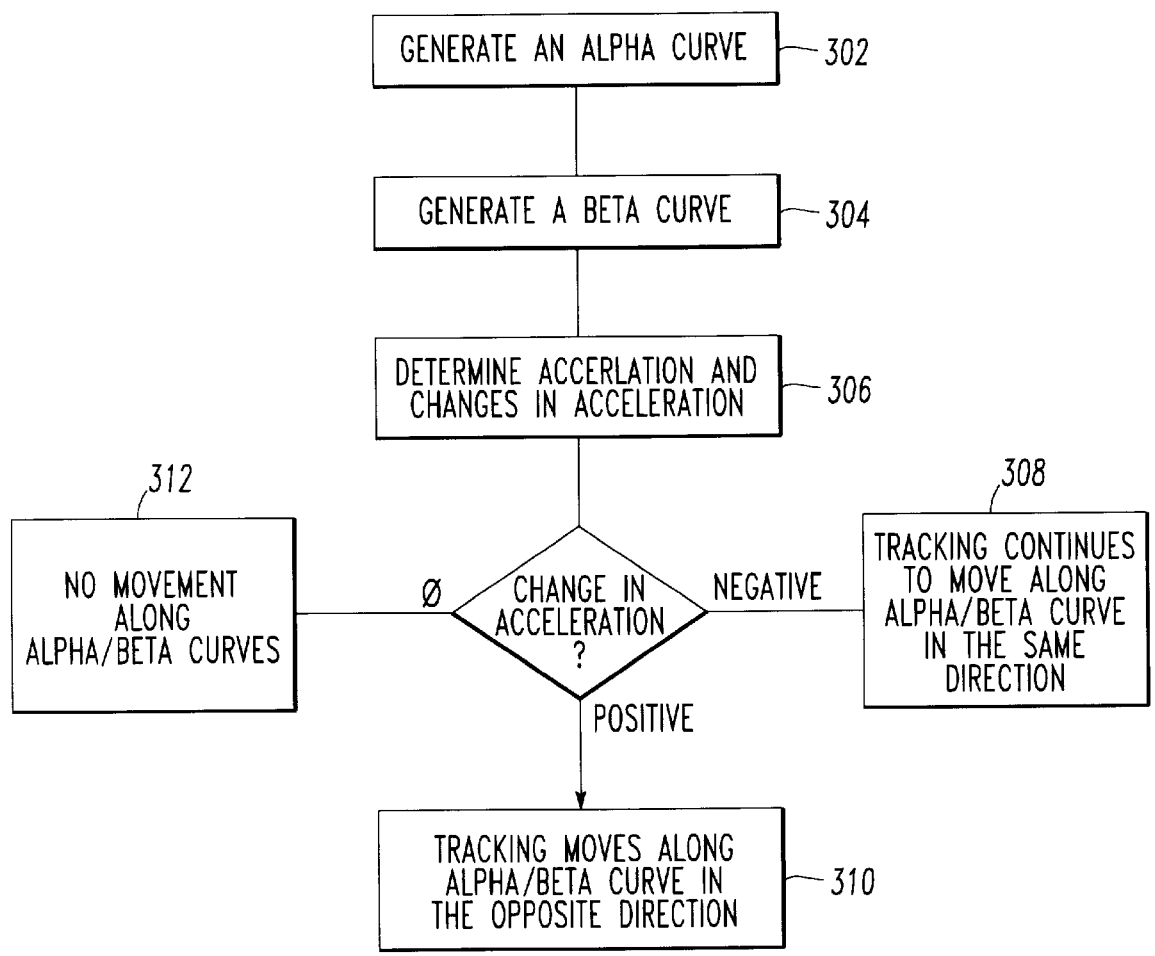
FIG. 3 illustrates a flow chart of operations performed by the apparatus for performing three-dimension alpha/beta tracking, in one embodiment of the present invention.
Figure 4:
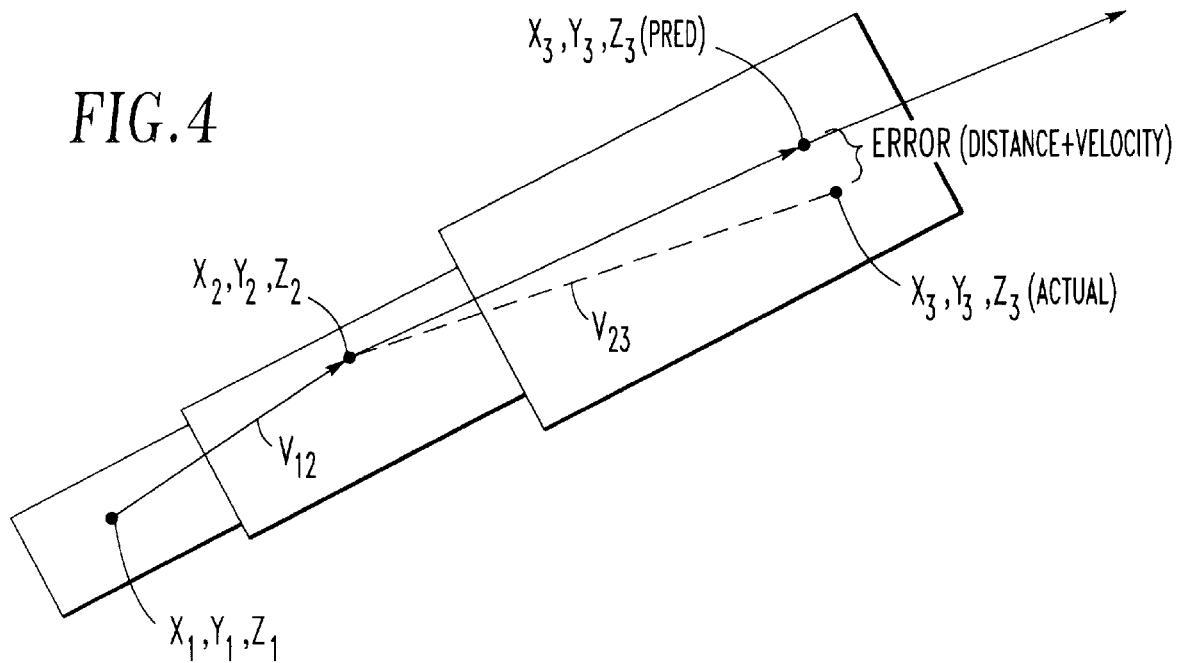
FIG. 4 illustrates an example of a track of interest, including positions and velocities, both predicted and actual, and errors therebetween, at one point.

First, the AMASS processor 141 generates an alpha curve, as illustrated in step 302 of FIG. 3, which represents position errors between a predicted three-dimensional position and a reported three-dimensional position of the track of interest. Next, the AMASS processor 141 generates a beta curve, as illustrated in step 304 of FIG. 3, representing velocity errors between the predicted velocity and the reported velocity of the track of interests at a plurality of times. FIG. 4 illustrates the position and velocity of an exemplary track of interest. The point $x_1y_1z_1$ represents the first point of the track of interest at time $t_1$. Point $x_2y_2z_2$ illustrates a position in three-dimension of the target of interest at time $t_2$. Using equations (1)–(14), a conventional tracker will predict a position at times $t_3$. However, there is inherently an error in both the velocity and distance, between the predicted position $x_3y_3z_3$ (pred) at time $t_3$ and the actual prediction $x_3y_3z_3$ (actual) at time $t_3$ as illustrated in FIG. 4.

Figure 5:
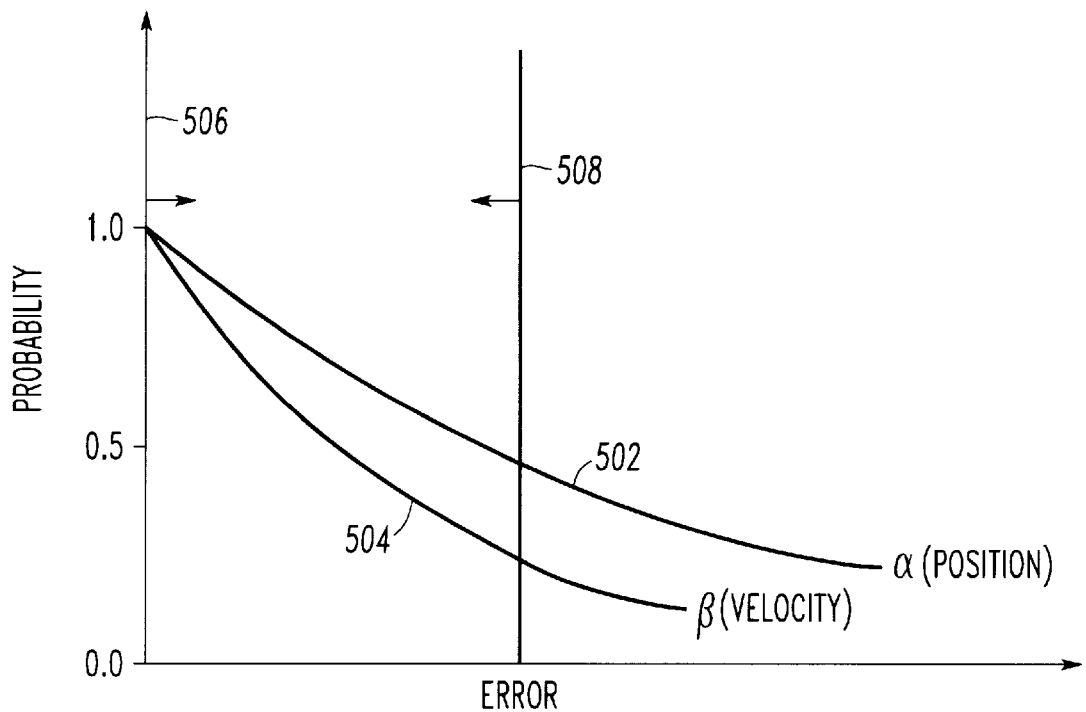
FIG. 5 is a graph of an alpha curve and a beta curve in a probability versus error plane.

One of the objectives of the present invention is to maintain the error in distance and velocity within predetermined values and either introduce or dampen oscillations, in order to keep the error within this predefined range. An example of such a range is illustrated in FIG. 5. FIG. 5 illustrates both an alpha curve 502 and a beta curve 504 in a probability versus error plane. As illustrated in FIG. 5, "rails" 506 and 508 are set in which the error is to be maintained. As the tracker moves along the alpha and beta curves within rails 506 and 508, the tracker of the present invention either dampens or introduces an error term in order to keep the error within the rails 506 and 508. For example, as the error, which begins with a probability of 1.0, begins to decrease, moving downward along the alpha/beta curves 502, 504, the error is permitted to decrease until rail 508 is reached. At this point, the error becomes too large, and the probability too low, that the tracker of the present invention dampens the error. In particular, the error is dampen utilizing a change in acceleration, as illustrated in FIG. 6.

Figure 6:
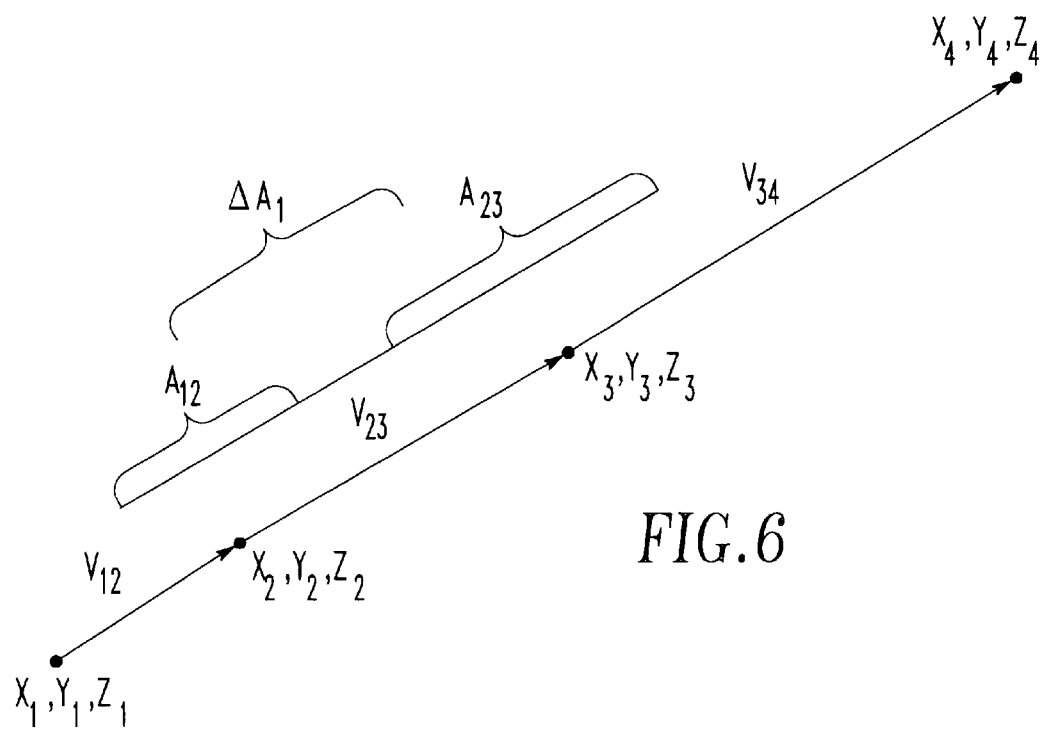
FIG. 6 illustrates positions, velocities, accelerations, and a change in acceleration for the track of interest illustrated in FIG. 4.
Figure 7A:
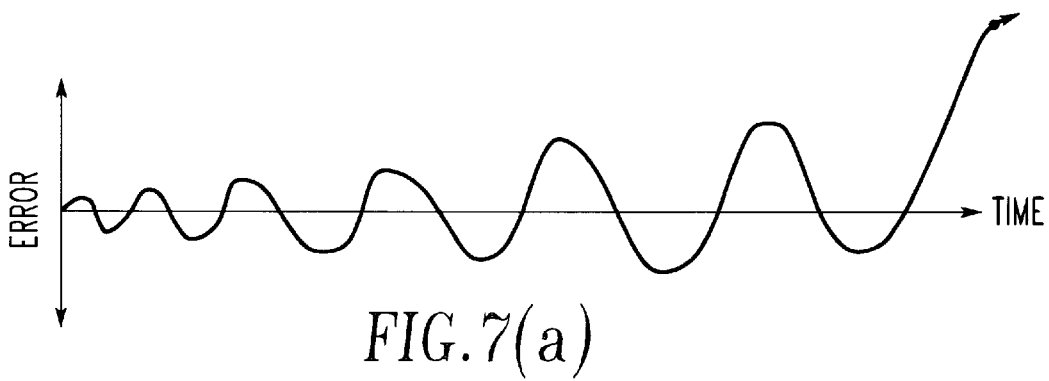
FIG. 7(a) illustrates a tracking error which grows exponentially with time and must be dampened by the method and apparatus of the present invention.

FIG. 6 illustrates four positional data points, $x_1y_1z_1$ through $x_4y_4z_4$. From these four position points, three velocity values $v_{12}$, $v_{23}$, and $V_{34}$ are produced, two acceleration values are produced $A_{12}$ and $A_{23}$, and one change in acceleration $\Delta A_1$ is generated. The value $\Delta A_1$ is utilized in order to introduce or dampen an error in the tracker of the present invention. As illustrated in FIG. 5, once the error reaches rail 508, the error is considered sufficiently high that dampening is required. As illustrated in FIG. 7(a), when the error continues to increase exponentially, the tracker of the present invention utilizes the change in acceleration $\Delta A_1$ in order to dampen the error and bring the error down to a more acceptable level. Similarly, as illustrated in FIG. 7(b), when the error decreases to virtually zero, the change in acceleration $\Delta A_1$ is utilized to introduce an error term, in order to push the error to a non-zero value, as illustrated in FIG. 7(b).

By either dampening or introducing an error, based on the change in acceleration, the tracker of the present invention maintains the error along both the alpha and beta curves illustrated in FIG. 5, within the rails 506 and 508. Returning to FIG. 3, the AMASS processor 141 determines an acceleration and a change in accleration $\Delta A_1$ for the track of interest (step 306). Finally, the AMASS processor 141 performs three-dimensional alpha/beta tracking on a track of interest such that as the tracking moves along the alpha curve 502 and the beta curve, 504 in the probability versus error plane in the first direction (the direction of increasing error in FIG. 5), when a magnitude of the change in accleration is negative, the tracking continues to move along the alpha curve 502 and the beta curve 504 in the first direction (step 308) and when the magnitude of the change in acceleration is positive, the tracking moves along the alpha curve 502 and the beta curve 504 in a second direction (the direction of decreasing error in FIG. 5), opposite to the first direction (step 310). The tracker does not move along the alpha curve 502 and the beta curve 504 if the change in acceleration is zero (step 312).

Figure 7B:
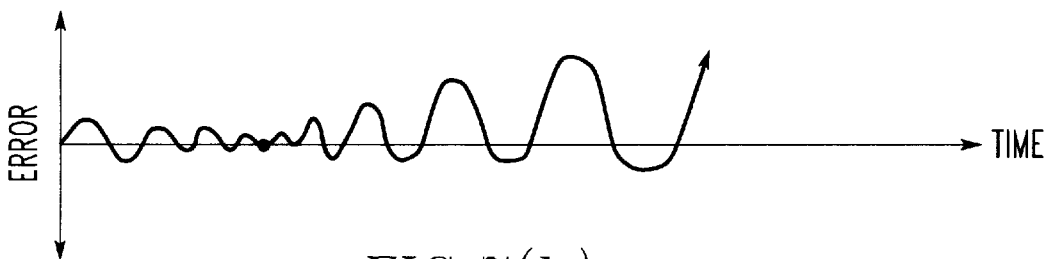
FIG. 7(b) illustrates the introduction of an error by the method and apparatus of the present invention.

In this manner, the method and apparatus of the present application can dampen a divergent oscillation as illustrated in FIG. 7(a) and introduce an error when the tracker converges, as illustrated in FIG. 7(b). As a result, the tracker is maintained within two "rails" 506, 508, as illustrated in FIG. 5 and when the tracker reaches one of the rails, the change in acceleration is utilized to dampen or introduce an error, in order to keep the tracker within the desired range, as identified by the two "rails", 506, 508.

As set forth above, the apparatus and method of the present application have immediate application for use in an alpha/beta tracker which is adapted for tracks with relatively high accelerations. The change in acceleration of the track is inversely used to introduce or dampen oscillations around the track, in order to keep the tracker within predefined "rails" in the probability versus error plane.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for performing three-dimensional alpha-beta tracking on a track of interest in an air traffic control environment, comprising:
   alpha curve generating means for generating an alpha curve, representing position errors between a three-dimensional position and a reported three-dimensional position of the track of interest in the air traffic control environment at a plurality of times;
   beta curve generating means for generating a beta curve, representing velocity errors between a predicted velocity and a reported velocity of the track of interest in the air traffic control environment at the plurality of times;
   plotting means for plotting the alpha curve and the beta curve in a probability versus error plane;
   acceleration determining means for determining an acceleration and a change in acceleration for the track of interest in the air traffic control environment at each of the plurality of times; and
   three-dimensional alpha-beta tracking means for performing three-dimensional alpha-beta tracking on the track of interest in the air traffic control environment such that as said three-dimensional alpha-beta tracking means move along the alpha curve and the beta curve in the probability versus error plane in a first direction, when a magnitude of the change in acceleration is negative, said three-dimensional alpha-beta tracking means continues to along the alpha curve and the beta curve in the first direction and when the magnitude of the change in acceleration is positive, said three-dimensional alpha-beta tracking means moves along the alpha curve and the beta curve in a second direction, opposite to the first direction.

2. The apparatus of claim 1, wherein when the magnitude of the change in acceleration is zero, said three-dimensional alpha-beta tracking means does not move along the alpha curve and the beta curve.

3. The apparatus of claim 1, wherein said three-dimensional alpha-beta tracking means dampens an oscillation in the track of interest in the air traffic control environment when continuing to move along the alpha curve and the beta curve in the first direction.

4. The apparatus of claim 1, wherein said three-dimensional alpha-beta tracking means introduces an oscillation in the track of interest in the air traffic control environment when moving along the alpha curve and the beta curve in the second direction, opposite to the first direction.

5. The apparatus of claim 1, wherein said three-dimensional alpha-beta tracking means is adapted for tracks of interest in the air traffic control environment with high accelerations.

6. A computer-implemented method for performing alpha-beta tracking on a track of interest in an air traffic control environment, comprising the steps of:
   (a) generating an alpha curve, representing position errors between a predicted three-dimensional position and a reported three-dimensional position of the track of interest in the air traffic control environment at a plurality of times;
   (b) generating a beta curve, representing velocity errors between a predicted velocity and a reported velocity of the track of interest in the air traffic control environment at the plurality of times;
   (c) plotting the alpha curve and the beta curve in a probability versus error plane;
   (d) determining an acceleration and a change in acceleration for the track of interest in the air traffic control environment at each of the plurality of times; and
   (e) performing three-dimensional alpha-beta tracking on the track of interest in the air traffic control environment such that as the three-dimensional alpha-beta tracking moves along the alpha curve and the beta curve in the probability versus error plane in a first direction, when a magnitude of the change in acceleration is negative, the three-dimensional alpha-beta tracking continues to move along the alpha curve and the beta curve in the first direction and when the magnitude of the change in acceleration is positive, the three-dimensional alpha-beta tracking moves along the alpha curve and the beta curve in a second direction, opposite to the first direction.

7. The computer-implemented method of claim 6, wherein when the magnitude of the change in acceleration is zero, the three-dimensional alpha-beta tracking does not move along the alpha curve and the beta curve.

8. The computer-implemented method of claim 6, wherein the three-dimensional alpha-beta tracking means dampens an oscillation in the track of interest in the air traffic control environment when continuing to move along the alpha curve and the beta curve in the first direction.

9. The computer-implemented method of claim 6, wherein the three-dimensional alpha-beta tracking introduces an oscillation in the track of interest in the air traffic control environment when moving along the alpha curve and the beta curve in the second direction, opposite to the first direction.

10. The computer-implemented method of claim 6, wherein the three-dimensional alpha-beta tracking is adapted for tracks of interest in the air traffic control environment with high accelerations.

11. An apparatus for performing three-dimensional alpha-beta tracking on a track of interest in an air traffic control environment, comprising:
   an alpha curve generator for generating an alpha curve, representing position errors between a three-dimensional position and a reported three-dimensional position of the track of interest in the air traffic control environment at a plurality of times;
   a beta curve generator for generating a beta curve, representing velocity errors between a predicted velocity and a reported velocity of the track of interest in the air traffic control environment at the plurality of times;

a plotter for plotting the alpha curve and the beta curve in a probability versus error plane;

an acceleration determining device for determining an acceleration and a change in acceleration for the track of interest in the air traffic control environment at each of the plurality of times; and a three-dimensional alpha-beta tracker for performing three-dimensional alpha-beta tracking on the track of interest in the air traffic control environment such that as said three-dimensional alpha-beta tracker move along the alpha curve and the beta curve in the probability versus error plane in a first direction, when a magnitude of the change in acceleration is negative, said three-dimensional alpha-beta tracker continues to move along the alpha curve and the beta curve in the first direction and when the magnitude of the change in acceleration is positive, said three-dimensional alpha-beta tracker moves along the alpha curve and the beta curve in a second direction, opposite to the first direction.

12. The apparatus of claim 11, wherein when the magnitude of the change in acceleration is zero, said three-dimensional alpha-beta tracker does not move along the alpha curve and the beta curve.

13. The apparatus of claim 11, wherein said three-dimensional alpha-beta tracker dampens an oscillation in the track of interest in the air traffic control environment when continuing to move along the alpha curve and the beta curve in the first direction.

14. The apparatus of claim 11, wherein said three-dimensional alpha-beta tracker introduces an oscillation in the track of interest in the air traffic control environment when moving along the alpha curve and the beta curve in the second direction, opposite to the first direction.

15. The apparatus of claim 11, wherein said three-dimensional alpha-beta tracker is adapted for tracks of interest in the air traffic control environment with high accelerations.

* * * * *